US012687801B2

(12) United States Patent
Gonda et al.

(10) Patent No.: US 12,687,801 B2
(45) Date of Patent: Jul. 21, 2026

(54) POWDER CONVEYING DEVICE AND IMAGE FORMING APPARATUS

(71) Applicant: FUJIFILM Business Innovation Corp., Tokyo (JP)

(72) Inventors: Yasuhisa Gonda, Kanagawa (JP); Shunsuke Yamasaki, Kanagawa (JP); Yuta Shimatate, Kanagawa (JP); Koji Yoshitsugu, Kanagawa (JP); Kazunari Ishii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/162,992

(22) Filed: Feb. 1, 2023

(65) Prior Publication Data

US 2024/0103404 A1 Mar. 28, 2024

(30) Foreign Application Priority Data

Sep. 27, 2022 (JP) ................................ 2022-154036

(51) Int. Cl.
*G03G 15/08* (2006.01)
*G03G 21/00* (2006.01)
(Continued)

(52) U.S. Cl.
CPC ..... *G03G 15/0891* (2013.01); *G03G 21/0052* (2013.01); *G03G 21/105* (2013.01); *G03G 21/206* (2013.01); *G03G 2221/1645* (2013.01)

(58) Field of Classification Search
CPC ........... G03G 15/0891; G03G 21/0052; G03G 21/105; G03G 21/206; G03G 2221/1645
See application file for complete search history.

(56) References Cited

U.S. PATENT DOCUMENTS 9,134,654 B2 * 9/2015 Yoneda ................ G03G 15/095
9,317,011 B2 * 4/2016 Mukataka ............ G03G 21/206
(Continued)

FOREIGN PATENT DOCUMENTS

JP 2014-025972 A 2/2014

*Primary Examiner* — Ryan D Walsh
(74) *Attorney, Agent, or Firm* — Oliff PLC

(57) ABSTRACT

A powder conveying device includes a first conveying component through which gas containing powder is to be conveyed; a second conveying component to which a downstream end of the first conveying component is connected and through which the gas received from the first conveying component is to be conveyed, the second conveying component extending in a second gas conveying direction that intersects a first gas conveying direction defined by the first conveying component; a third conveying component extending from the second conveying component and through which the gas received from the second conveying component is to be conveyed, the third conveying component extending in a third gas conveying direction that intersects the second gas conveying direction; a fourth conveying component to which a downstream end of the third conveying component is connected and through which the gas received from the third conveying component is to be conveyed, the fourth conveying component extending in a fourth gas conveying direction that intersects the third gas conveying direction; and a removing component provided on a downstream side in the fourth gas conveying direction relative to the fourth conveying component, the removing component being configured to remove powder from the gas.

20 Claims, 4 Drawing Sheets

(51) Int. Cl.
*G03G 21/10* (2006.01)
*G03G 21/20* (2006.01)

(56) References Cited

U.S. PATENT DOCUMENTS

| | | | | |
|---|---|---|---|---|
| 11,106,177 | B1* | 8/2021 | Nomura | G03G 21/206 |
| 2011/0211860 | A1* | 9/2011 | Shimoyama | G03G 21/206 399/93 |
| 2012/0230720 | A1* | 9/2012 | Murano | G03G 21/206 399/92 |
| 2013/0064567 | A1* | 3/2013 | Akama | G03G 21/206 399/92 |
| 2014/0294580 | A1* | 10/2014 | Ryuzaki | F04D 29/441 415/208.1 |
| 2015/0110518 | A1* | 4/2015 | Nagamori | G03G 21/206 399/92 |
| 2020/0019117 | A1* | 1/2020 | Nomura | G03G 21/206 |
| 2020/0026235 | A1* | 1/2020 | Kawatani | G03G 21/206 |
| 2020/0363769 | A1* | 11/2020 | Kawabata | G03G 21/206 |
| 2023/0021525 | A1* | 1/2023 | Fujita | G03G 21/206 |
| 2023/0305483 | A1* | 9/2023 | Takayama | G03G 21/1633 |

* cited by examiner

POWDER CONVEYING DEVICE AND IMAGE FORMING APPARATUS

CROSS-REFERENCE TO RELATED APPLICATIONS

This application is based on and claims priority under 35 USC 119 from Japanese Patent Application No. 2022-154036 filed Sep. 27, 2022.

BACKGROUND

(i) Technical Field

The present disclosure relates to a powder conveying device and an image forming apparatus.

(ii) Related Art

A known technique disclosed by Japanese Unexamined Patent Application Publication No. 2014-025972 ([0024] to [0033], FIG. 1) relates to a structure included in an image forming apparatus and configured to convey powder such as developer particles, paper lint, or discharge products.

In the structure disclosed by Japanese Unexamined Patent Application Publication No. 2014-025972, suction ducts (111) are provided for respective image forming units (30Y, 30M, 30C, and 30K) and are connected to a hollow cuboidal common duct (113), the common duct (113) has a connection port (113A) connected to a tonner collector (120), and toner particles are to be suctioned through the suction ducts (111) by a cyclone unit (122) of the tonner collector (120). According to Japanese Unexamined Patent Application Publication No. 2014-025972, the suction ducts (111) are provided at respective inlets (111*a*) thereof with respective narrowing members (112) that narrow the cross-sectional areas of the suction ducts (111).

SUMMARY

Aspects of non-limiting embodiments of the present disclosure relate to making the life of a removing component longer than in a case where a plurality of transport paths are all connected to a common transport path.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a powder conveying device comprising:

- a first conveying component through which gas containing powder is to be conveyed;
- a second conveying component to which a downstream end of the first conveying component is connected and through which the gas received from the first conveying component is to be conveyed, the second conveying component extending in a second gas conveying direction that intersects a first gas conveying direction defined by the first conveying component;
- a third conveying component extending from the second conveying component and through which the gas received from the second conveying component is to be conveyed, the third conveying component extending in a third gas conveying direction that intersects the second gas conveying direction;
- a fourth conveying component to which a downstream end of the third conveying component is connected and through which the gas received from the third conveying component is to be conveyed, the fourth conveying component extending in a fourth gas conveying direction that intersects the third gas conveying direction; and
- a removing component provided on a downstream side in the fourth gas conveying direction relative to the fourth conveying component, the removing component being configured to remove powder from the gas.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will now be described with reference to the accompanying drawings. Note that the present disclosure is not limited to the following exemplary embodiment.

Figure 1:
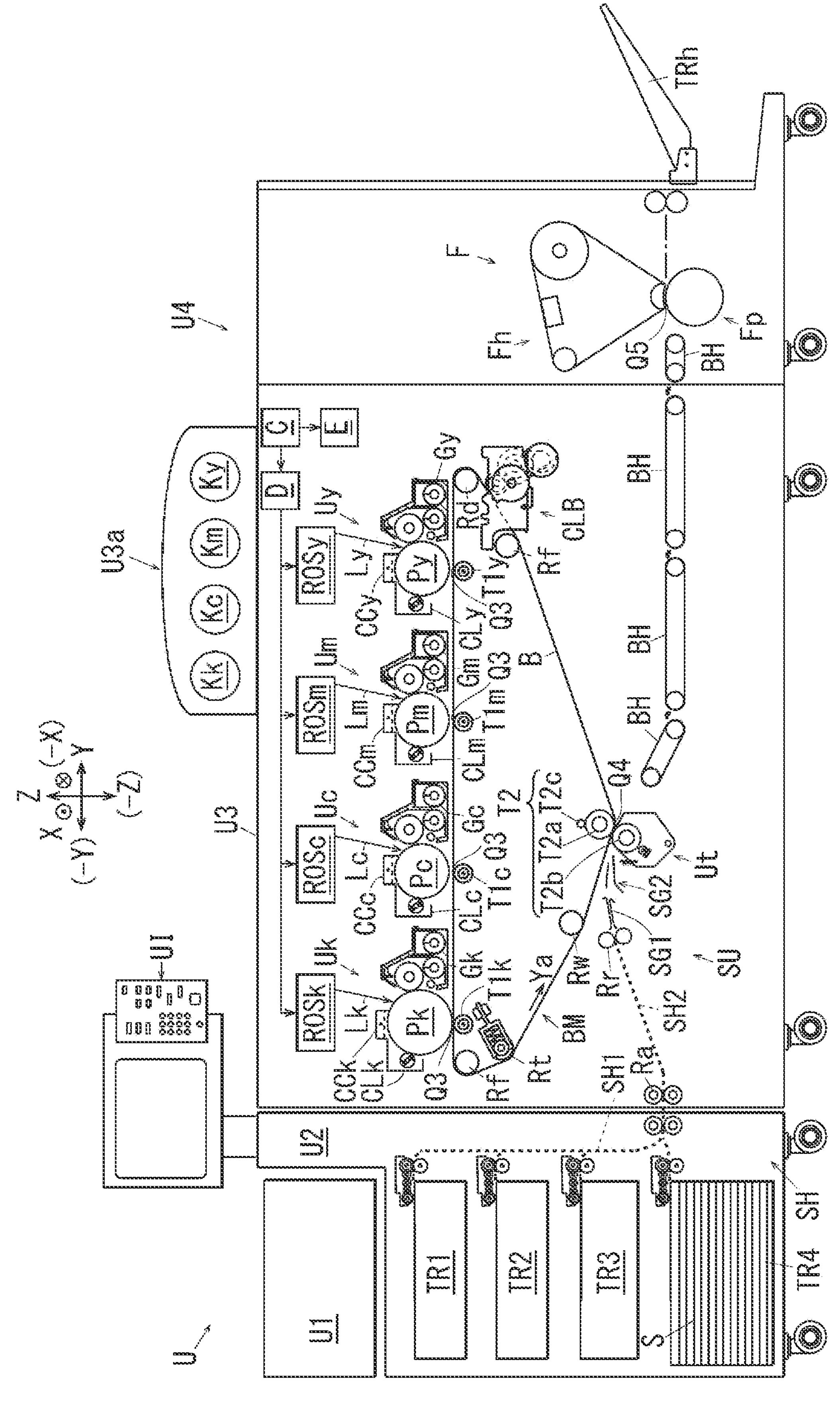
FIG. 1 illustrates the entirety of an image forming apparatus according to an exemplary embodiment of the present disclosure.

To help understand the following description, FIG. 1 is provided with an X axis representing the front-rear direction; a Y axis representing the left-right direction; a Z axis representing the top-bottom direction; and arrows X, −X, Y, −Y, Z, and −Z representing the frontward, rearward, rightward, leftward, upward, and downward directions or the front, rear, right, left, upper, and lower sides, respectively.

Furthermore, in FIG. 1, a circle with a dot is regarded as an arrow representing the direction from the back of the page toward the front of the page, and a circle with a cross is regarded as an arrow representing the direction from the front of the page toward the back of the page.

To help understand the following description, irrelevant elements are not illustrated in the drawings.

Exemplary Embodiment

FIG. 1 illustrates the entirety of an image forming apparatus according to an exemplary embodiment of the present disclosure.

Referring to FIG. 1, a copying machine U is an exemplary image forming apparatus and includes an operation unit UI; a scanner device U1, which is an exemplary image reading device; a sheet feeding device U2; a printer unit U3, which is an exemplary image recording component; and a sheet output unit U4.

The operation unit UI includes input parts, for example, a power button and various keys such as a copy start key, a copy-number-setting key, and a numerical keypad; and other parts such as a display.

The scanner device U1 reads a document (not illustrated), converts an image of the document into image information, and inputs the image information to the printer unit U3.

The sheet feeding device U2 includes a plurality of sheet feeding trays TR1, TR2, TR3, and TR4, which are exemplary sheet feeding units. The sheet feeding trays TR1 to TR4 each contain recording sheets S, which are each an exemplary medium. A sheet feeding path SH1 is an exemplary transport path for the medium and extends from the sheet feeding trays TR1 to TR4 to the printer unit U3.

The printer unit U3 illustrated in FIG. 1 includes a controller C and a power circuit E, which is controlled by the controller C and supplies power to relevant elements of the printer unit U3. The controller C receives the image information representing the document that is read by the scanner device U1, or image information that is transmitted from a personal computer serving as an exemplary information transmitting device (not illustrated) connected to the copying machine U.

The controller C processes the received image information into pieces of printing information for yellow Y, magenta M, cyan C, and black K and outputs the pieces of printing information to a laser driving circuit D, which is an exemplary driving circuit for latent-image-forming components. The laser driving circuit D receives a laser driving signal from the controller C and outputs with a predetermined timing the laser driving signal to exposure devices ROSy, ROSm, ROSc, and ROSk, which are the exemplary latent-image-forming components for the respective colors.

Image carrier units Uy, Um, Uc, and Uk for the respective colors of Y, M, C, and K are provided below the respective exposure devices ROSy, ROSm, ROSc, and ROSk.

Referring to FIG. 1, the image carrier unit Uk for black K includes a photoconductor drum Pk, which is an exemplary image carrying component; a charging corotron CCk, which is an exemplary charging component; and a photoconductor cleaner CLk, which is an exemplary cleaning component for the image carrying component. The image carrier units Uy, Um, and Uc for the other colors of Y, M, and C also include respective photoconductor drums Py, Pm, and Pc; respective charging corotrons CCy, CCm, and CCc; and respective photoconductor cleaners CLy, CLm, and CLc.

In the present exemplary embodiment, the photoconductor drum Pk for the color K, which tends to be used frequently and therefore wears fast, has a larger diameter than the photoconductor drums Py, Pm, and Pc for the other colors. Correspondingly, the photoconductor drum Pk is rotatable faster and is given a longer life than the others.

The photoconductor drums Py, Pm, Pc, and Pk are uniformly charged by the respective charging corotrons CCy, CCm, CCc, and CCk and are then irradiated with respective laser beams Ly, Lm, Lc, and Lk, which are exemplary latent-image-forming rays, emitted from the respective exposure devices ROSy, ROSm, ROSc, and ROSk, whereby electrostatic latent images are formed on the respective photoconductor drums Py, Pm, Pc, and Pk. The electrostatic latent images thus formed on the photoconductor drums Py, Pm, Pc, and Pk are developed into toner images in the respective colors of yellow Y, magenta M, cyan C, and black K by respective developing devices Gy, Gm, Gc, and Gk, which are exemplary developing components.

The toner images on the photoconductor drums Py, Pm, Pc, and Pk are sequentially transferred to an intermediate transfer belt B, which is an exemplary intermediate transfer component and an exemplary image carrying component, in respective first transfer areas Q3 by respective first transfer rolls T1*y*, T1*m*, T1*c*, and T1*k*, which are exemplary first transfer components, whereby the toner images are superposed one on top of another and form a multicolor image, or a so-called color image, on the intermediate transfer belt B. The color image thus formed on the intermediate transfer belt B is transported to a second transfer area Q4.

If the image information contains black image data alone, only the photoconductor drum Pk and the developing device Gk for black K are used, whereby only a black toner image is formed.

After the above first transfer process, residual toner particles on the photoconductor drums Py, Pm, Pc, and Pk are removed by the respective photoconductor cleaners CLy, CLm, CLc, and CLk.

Combinations of the image carrier units Uy, Um, Uc, and Uk and the respective developing devices Gy, Gm, Gc, and Gk are regarded as toner-image-forming members Uy+Gy, Um+Gm, Uc+Gc, and Uk+Gk and serve as exemplary image forming components.

The printer unit U3 is provided at the top thereof with a toner dispenser U3*a*, which is an exemplary refilling component. Toner cartridges Ky, Km, Kc, and Kk are exemplary developer containing components and are detachably attached to the toner dispenser U3*a*. When toners in the respective developing devices Gy, Gm, Gc, and Gk are consumed with an image forming operation, fresh toners in the respective toner cartridges Ky, Km, Kc, and Kk are supplied to the respective developing devices Gy, Gm, Gc, and Gk.

The intermediate transfer belt B is located below the photoconductor drums Py, Pm, Pc, and Pk and is stretched over the following: an intermediate driving roll Rd, which is an exemplary driving component for the intermediate transfer component; an intermediate tension roll Rt, which is an exemplary tension applying component that applies a tension to the intermediate transfer belt B; an intermediate steering roll Rw, which is an exemplary first skew correcting component that corrects any skew or meander of the intermediate transfer belt B; a plurality of intermediate idler rolls Rf, which are exemplary follower components; and a backup roll T2*a*, which is an exemplary counter component provided in the second transfer area Q4. The intermediate transfer belt B thus supported is rotatable in the direction of arrow Ya with the activation of the intermediate driving roll Rd.

A combination of the intermediate driving roll Rd, the intermediate tension roll Rt, the intermediate steering roll Rw, the intermediate idler rolls Rf, the backup roll T2*a*, the first transfer rolls T1*y*, T1*m*, T1*c*, and T1*k*, the intermediate transfer belt B, and other relevant elements is regarded as a belt module BM, which is an exemplary intermediate transfer device. The belt module BM according to the present exemplary embodiment is an exchangeable unit that is detachable from the printer unit U3.

A second transfer unit Ut is an exemplary transfer-transporting component and is provided below the backup roll T2*a*. The second transfer unit Ut includes a second transfer roll T2*b*, which is an exemplary transfer member. The second transfer roll T2*b* is positioned against the backup roll T2*a*. The area where the second transfer roll T2*b* faces the intermediate transfer belt B is regarded as the second transfer area Q4. The backup roll T2*a* is provided with a contact roll T2*c*, which is an exemplary contact component for voltage application and is in contact with the backup roll T2*a*. The contact roll T2*c* receives a second transfer voltage, which is applied with a preset timing from the power circuit E controlled by the controller C and has the same polarity as for toner charging.

A combination of the rolls T2*a* to T2*c* is regarded as a second transfer device T2, which is as an exemplary second transfer component. A combination of the intermediate transfer belt B, the first transfer rolls T1*y*, T1*m*, T1*c*, and T1*k*, the second transfer device T2, and other relevant elements is regarded as a transfer device B+T1+T2, which is an exemplary transfer component.

A sheet transport path SH2 runs below the belt module BM. A recording sheet S fed from the sheet feeding path SH1 in the sheet feeding device U2 is transported to the sheet transport path SH2 by transporting rolls Ra, which are exemplary transporting components. Synchronously with the timing of any toner image's being transported to the second transfer area Q4, the recording sheet S in the sheet transport path SH2 is forwarded by a registration roll Rr, which is an exemplary forwarding component, and is guided to the second transfer area Q4 by sheet guides SG1 and SG2, which are exemplary medium guiding components.

The toner image on the intermediate transfer belt B is transferred to the recording sheet S by the second transfer device T2 when passing through the second transfer area Q4. In the case of a color image, toner images superposed one on top of another on the intermediate transfer belt B in the first transfer process are transferred to the recording sheet S at a time in a second transfer process.

The intermediate transfer belt B having undergone the second transfer process is cleaned by a belt cleaner CLB, which is an exemplary cleaning component for the intermediate transfer component.

The recording sheet S having received the toner image in the second transfer process is transported to medium transporting belts BH, which are exemplary transporting components. The medium transporting belts BH transport the recording sheet S to a fixing device F. The fixing device F is an exemplary fixing component and includes a heating unit Fh, which is an exemplary heating component; and a pressing roll Fp, which is an exemplary pressing component. The heating unit Fh and the pressing roll Fp are positioned against each other in an area serving as a fixing area Q5.

The toner image on the recording sheet S is thermally fixed by the fixing device F when passing through the fixing area Q5. The recording sheet S having the toner image thus fixed by the fixing device F is outputted to an output tray TRh, which is an exemplary output part.

A combination of the sheet feeding path SH1, the sheet transport path SH2, and other relevant paths is regarded as a sheet transport path SH. A combination of the sheet transport path SH, the transporting rolls Ra, the registration roll Rr, the sheet guides SG1 and SG2, the medium transporting belts BH, and other relevant elements is regarded as a sheet transporting device SU.

Description of Powder Conveying Device

Figure 2:
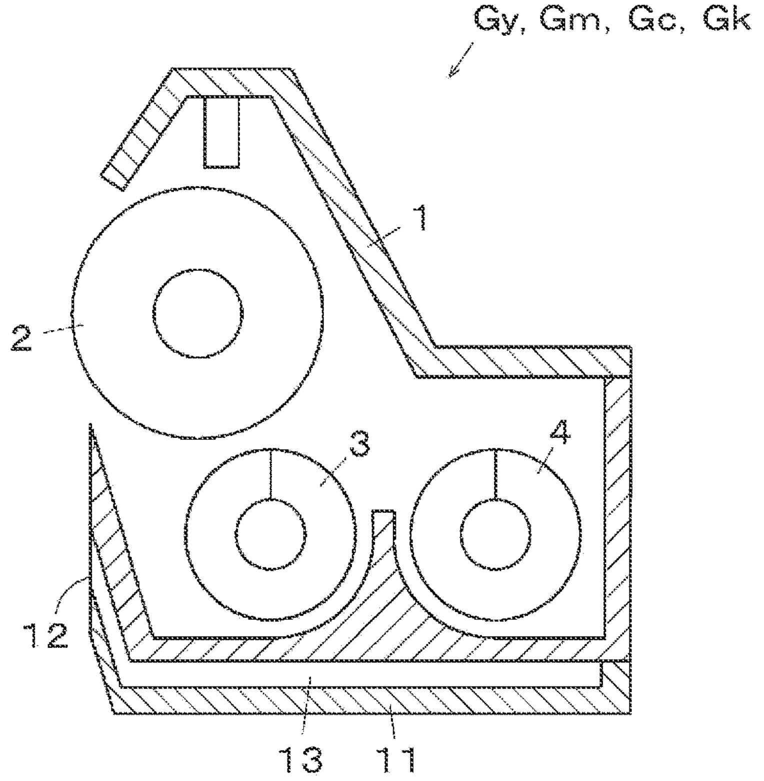
FIG. 2 illustrates one of developing devices according to the exemplary embodiment.

FIG. 2 illustrates the developing device Gy according to the present exemplary embodiment.

As illustrated in FIG. 2, the developing device Gy according to the present exemplary embodiment includes a development housing 1, which is an exemplary containing component. The development housing 1 contains developer particles, which are exemplary powder. The development housing 1 is provided with a developing roll 2, which is an exemplary developer carrying component. The developing roll 2 is positioned in such a manner as to face the photoconductor drum Py. The development housing 1 is further provided with circulating augers 3 and 4, which are exemplary circulating components. The circulating augers 3 and 4 cause the developer particles in the development housing 1 to circulate.

The development housing 1 is provided with a collecting duct 11, which is an exemplary powder collecting component and is supported at the bottom of the development housing 1. The collecting duct 11 has a collecting port 12, which is open toward the photoconductor drum Py. The collecting duct 11 provides thereinside a collecting path 13, which extends along the bottom surface of the development housing 1 and in the front-rear direction (the axial direction of the photoconductor drum Py). Gas containing developer particles is taken into the collecting duct 11 through the collecting port 12 and is to be conveyed along the collecting path 13.

Figure 3:
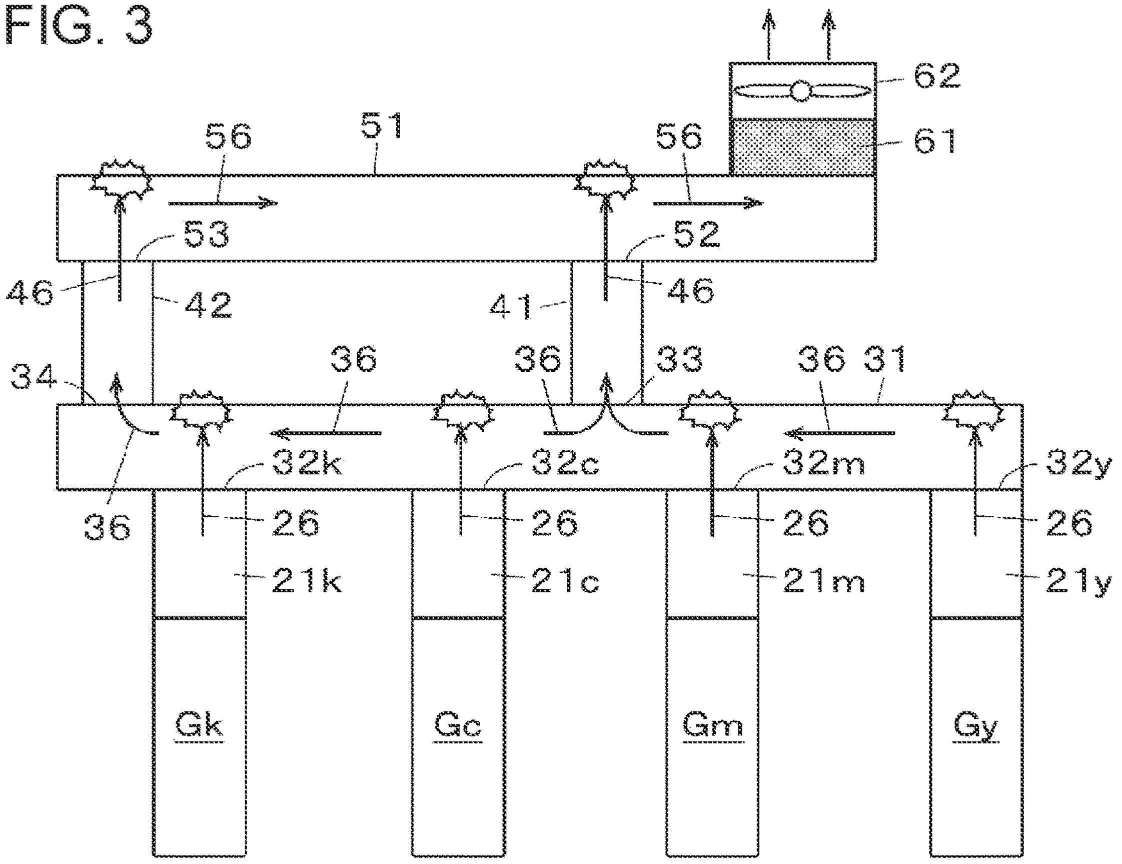
FIG. 3 illustrates the entirety of a powder conveying device connected to the developing devices according to the exemplary embodiment.

FIG. 3 illustrates the entirety of a powder conveying device connected to the developing devices Gy, Gm, Gc, and Gk according to the exemplary embodiment.

Figure 4:
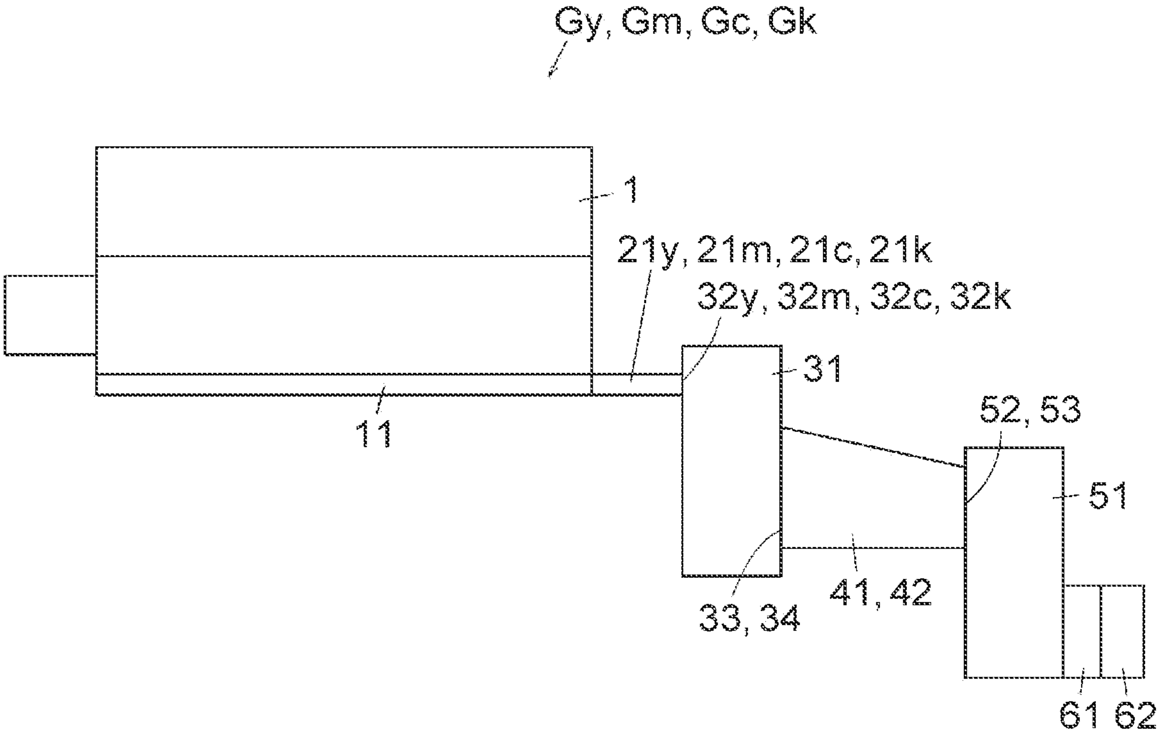
FIG. 4 is a side view of the powder conveying device.

FIG. 4 is a side view of the powder conveying device.

Referring to FIGS. 2 to 4, the collecting duct 11 receives at the rear end thereof an individual duct 21, which is an exemplary first conveying component. The developing devices Gy, Gm, Gc, and Gk for the respective colors are provided with respective collecting ducts 11 (11*y*, 11*m*, 11*c*, and 11*k*), and the collecting ducts 11 receive respective individual ducts 21 (21*y*, 21*m*, 21*c*, and 21K). The individual ducts 21 according to the present exemplary embodiment each extend rearward. Therefore, the gas in each of the individual ducts 21 according to the present exemplary embodiment is conveyed in a rearward direction, which is an exemplary first gas conveying direction 26.

The rear ends of the individual ducts 21 are connected to an intermediate duct 31, which is an exemplary second conveying component. The intermediate duct 31 has a hollow box shape extending in the left-right direction and receives all of the four individual ducts 21*y*, 21*m*, 21*c*, and 21*k*. In the present exemplary embodiment, the four individual ducts 21*y*, 21*m*, 21*c*, and 21K are connected to respective intermediate inlets 32 (32*y*, 32*m*, 32*c*, and 32K), which are provided in an upper end part of the intermediate duct 31. The intermediate duct 31 has in a lower end part thereof first and second intermediate outlets 33 and 34. Referring to FIG. 3, the first intermediate outlet 33 is located between the intermediate inlet 32*m* for the color M and the intermediate inlet 32*c* for the color C in the left-right direction. The second intermediate inlet 34 is located at a position staggered to the outer side (left side) from the intermediate inlet 32*k* for the color K.

Therefore, in the intermediate duct 31 according to the present exemplary embodiment, the gas received from the intermediate inlets 32 is conveyed toward the intermediate outlets 33 and 34, specifically, in a second gas conveying direction 36, which contains a lateral component and a downward component. Hence, the second gas conveying direction 36 defined by the intermediate duct 31 is not parallel to but intersects the first gas conveying direction 26 defined by each of the individual ducts 21.

The intermediate outlets 33 and 34 receive respective connection ducts 41 and 42, which are exemplary third conveying components. In the present exemplary embodiment, the two connection ducts 41 and 42 have the same configuration. The connection ducts 41 and 42 each extend rearward. Therefore, the gas in the connection ducts 41 and 42 according to the present exemplary embodiment is conveyed in a rearward direction, which is an exemplary third gas conveying direction 46. Hence, in the present exemplary embodiment, the third gas conveying direction 46 defined by each of the connection ducts 41 and 42 and the second gas conveying direction 36 defined by the intermediate duct 31 intersect each other.

Referring to FIG. 4, the connection ducts 41 and 42 also serve as exemplary impact-force-increasing components and each have a size in the top-bottom direction that decreases toward the rear side. In other words, the connection ducts 41 and 42 are each narrowed toward the rear side. Accordingly, the cross-sectional area of each of the connection ducts 41 and 42 through which the gas flows decreases toward the rear side. Therefore, the gas that is conveyed in the third gas conveying direction 46 gathers speed while flowing toward the downstream side, which is the rear side. The method of increasing the flow speed of the gas is not limited to narrowing the connection ducts 41 and 42 and may be any method, such as decreasing the cross-sectional area of the duct with a swollen inner wall.

The rear ends of the connection ducts 41 and 42 are connected to a final duct 51, which is an exemplary fourth conveying component. The final duct 51 has a hollow pipe shape extending in the left-right direction. In the present exemplary embodiment, the two connection ducts 41 and 42 are connected to respective final inlets 52 and 53, which are provided in an upper part of the final duct 51 as illustrated in FIG. 4. The final duct 51 is provided at the downstream end, or the right end, thereof with a filter 61, which is an exemplary removing component; and a fan 62, which is an exemplary exhausting member.

Referring to FIG. 3, the gas in the final duct 51 according to the present exemplary embodiment is conveyed in a rightward direction, which is an exemplary fourth gas conveying direction 56, from the final inlets 52 and 53 toward the fan 62. Accordingly, the fourth gas conveying direction 56 defined by the final duct 51 intersects the third gas conveying direction 46 defined by each of the connection ducts 41 and 42.

Figure 5:
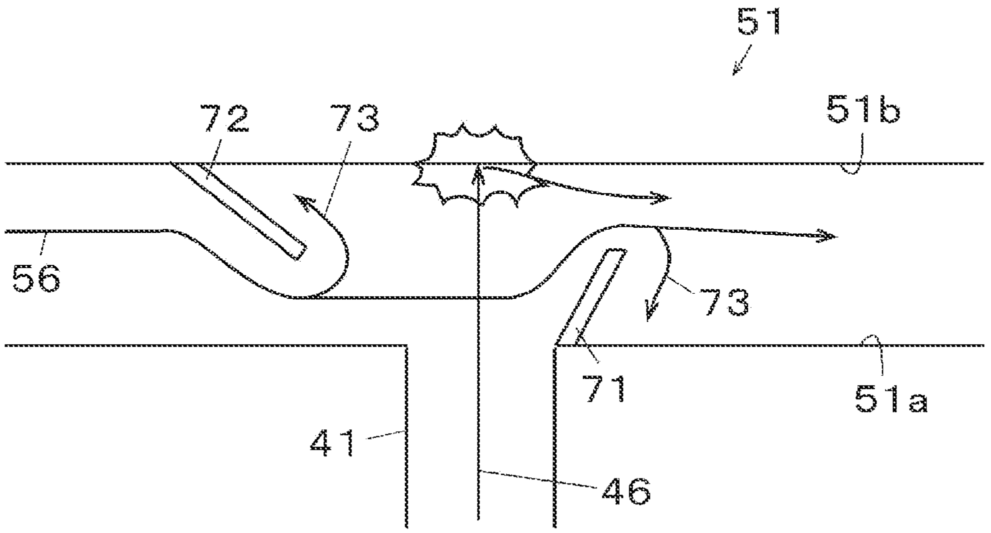
FIG. 5 illustrates vortex generating components according to the exemplary embodiment.

FIG. 5 illustrates vortex generating components according to the present exemplary embodiment.

Referring to FIG. 5, the final duct 51 according to the present exemplary embodiment is provided thereinside with first and second ribs 71 and 72, which are exemplary vortex generating components. The first rib 71 is located at the connection between the first connection duct 41, which is an exemplary upstream one of the conveying components, and the final duct 51, which is an exemplary downstream one of the conveying components. The first rib 71 according to the present exemplary embodiment projects from the front wall, 51*a*, of the final duct 51 diagonally to the right rear in such a manner as to intersect the third gas conveying direction 46. The second rib 72 according to the present exemplary embodiment projects from the rear wall, 51*b*, of the final duct 51 diagonally to the right front in such a manner as to intersect the fourth gas conveying direction 56.

While FIG. 5 illustrates only the ribs 71 and 72 provided near the connection between the final duct 51 and the first connection duct 41, such ribs may further be provided at other locations, such as near the connection between the final duct 51 and the second connection duct 42 or near the filter 61.

A combination of the above elements denoted by reference signs 11 to 72 serves as a developer collecting device 11-72, which is an exemplary powder conveying device according to the present exemplary embodiment.

Functions of Exemplary Embodiment

In the copying machine U according to the present exemplary embodiment employing the above configuration, when an image forming operation is started, a development voltage (development bias) is applied to development areas, where the photoconductor drums Py, Pm, Pc, and Pk face the respective developing rolls 2. Accordingly, developer particles move to the latent images formed by the respective exposure devices ROSy, ROSm, ROSc, and ROSk, whereby the latent images are developed. Some of the developer particles that move during the above development process may scatter or float in the air, or some of the developer particles carried by the photoconductor drums Py, Pm, Pc, and Pk and the developing rolls 2 may come off under the centrifugal force generated by the rotation of those elements or for any other reason and may float in the air. Such airborne developer particles are taken into the collecting ducts 11 through the collecting ports 12. Developer particles taken into the collecting ducts 11 advance through the individual ducts 21 and flow into the intermediate duct 31.

Figure 6:
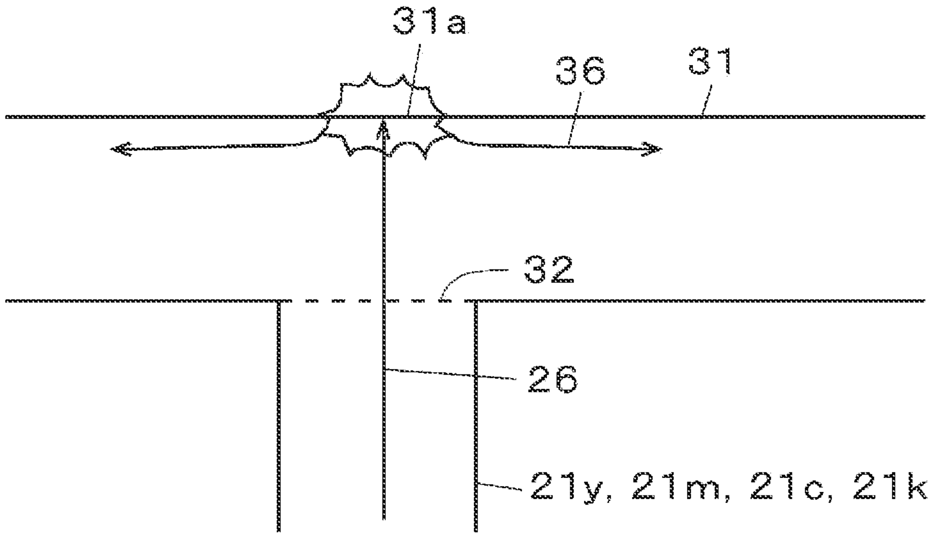
FIG. 6 illustrates a function of the exemplary embodiment.

FIG. 6 illustrates a function of the exemplary embodiment.

Referring to FIG. 6, the gas containing developer particles and conveyed through the individual ducts 21 impacts on a wall surface 31*a* of the intermediate duct 31. Note that, in the present exemplary embodiment, the intermediate inlets 32 are staggered from the intermediate outlets 33 and 34 in the left-right direction and in the top-bottom direction. Hence, there is substantially no chance that the gas flowing from the individual ducts 21 may directly flow into the connection ducts 41 and 42 without impacting on the wall surface 31*a* of the intermediate duct 31. When the gas impacts on the wall surface 31*a*, some of the developer particles adhere to the wall surface 31*a*. Correspondingly, the amount of developer particles contained in the gas is reduced.

Furthermore, in the present exemplary embodiment, the gas conveyed in the first gas conveying direction 26 and impacted on the wall surface 31*a* is conveyed in the second gas conveying direction 36, which intersects the first gas conveying direction 26. Therefore, the flow speed of the gas is reduced, and some of the developer particles contained in the gas fall under gravity and accumulate at the bottom of the intermediate duct 31. Correspondingly, the amount of developer particles contained in the gas is further reduced.

The gas having flowed through the intermediate duct 31 flows into the connection ducts 41 and 42 and then into the final duct 51. When the gas flows into the final duct 51, as with the case illustrated in FIG. 6, the gas impacts on the rear wall 51*b* of the final duct 51. Accordingly, some of the developer particles contained in the gas adhere to the rear wall 51*b*, and the amount of developer particles is further reduced.

Thus, in the developer collecting device according to the present exemplary embodiment, the amount of developer particles collected through the collecting ports 12 is reduced in the intermediate duct 31 and in the final duct 51, whereby the amount of developer particles that reach the filter 61 is reduced.

In the present exemplary embodiment, the intermediate duct 31 and the final duct 51 in which developer particles adhere to the wall surface or accumulate at the bottom each have a capacity that is large enough not to cause clogging with developer particles that may bring the necessity of exchange of the duct 31 or 51 before the life of the copying machine U as a product is reached.

The connection ducts 41 and 42 according to the present exemplary embodiment each have a cross-sectional area that decreases toward the rear side, that is, toward the downstream side in the third gas conveying direction 46. Therefore, the flow speed of the gas increases toward the downstream side, and the force of impact of the gas on the rear wall 51*b* increases. The final duct 51 according to the present exemplary embodiment is provided with the ribs 71 and 72. Referring to FIG. 5, when the flow of the gas approaches the rib 71 or 72, some of the gas goes around the rib 71 or 72. Thus, a vortex 73 is generated on the downstream side relative to the rib 71 or 72. The developer particles contained in the gas taken into the vortex 73 tend to stagnate and accumulate at the vortex 73. Correspondingly, the amount of developer particles that reach the filter 61 is reduced.

In the present exemplary embodiment, referring to FIG. 5, the flow of the gas conveyed from the first connection duct 41 intersects the flow of the gas discharged from the second connection duct 42 and traveling through the final duct 51 in the fourth gas conveying direction 56, whereby the gases are disturbed at the intersection. Therefore, some of the gases tends to stagnate, or some of the developer particles contained in the gas tend to fall and accumulate. Correspondingly, the amount of developer particles that reach the filter 61 is further reduced.

Modification of Exemplary Embodiment

Figure 7:
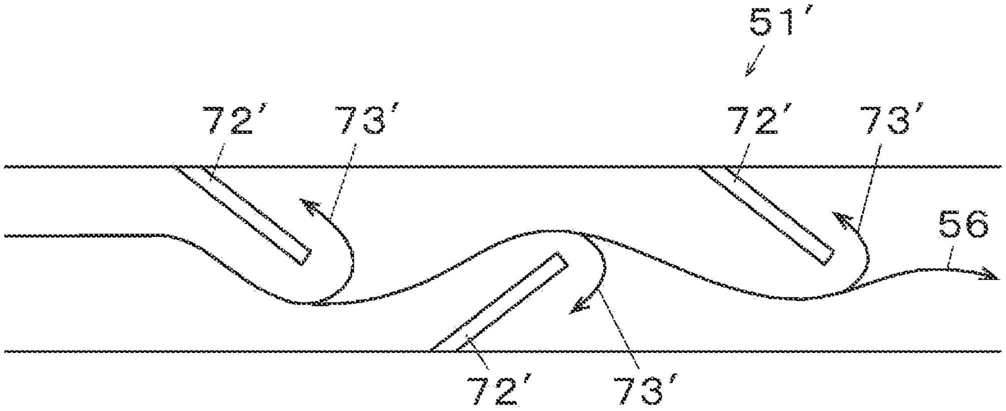
FIG. 7 illustrates a modification of the exemplary embodiment.

FIG. 7 illustrates a modification of the exemplary embodiment.

As illustrated in FIG. 7, a final duct 51' is provided with ribs 72', which are arranged alternately in the fourth gas conveying direction 56, whereby a substantially zig-zag passage may be provided.

Variations

While an exemplary embodiment of the present disclosure has been described in detail above, the present disclosure is not limited to the above exemplary embodiment. Various changes may be made to the above exemplary embodiment within the scope of the present disclosure defined by the appended claims. Variations (H01) to (H07) of the present disclosure are as follows.

(H01) While the above exemplary embodiment relates to the copying machine U serving as an exemplary image forming apparatus, the image forming apparatus is not limited thereto and may be, for example, a facsimile, a printer, or a multifunction machine.

(H02) While the above exemplary embodiment relates to an image forming apparatus to be used with developers having four respective colors, the image forming apparatus is not limited thereto and may be, for example, a monochrome image forming apparatus or any other multicolor image forming apparatus to be used with developers having three or less colors or five or more colors.

(H03) While the above exemplary embodiment relates to a configuration in which the intermediate duct 31 and the connection ducts 41 and 42 are provided between a set of the individual ducts 21 and the final duct 51, the configuration of ducts is not limited thereto. For example, any ducts may be added between the set of the individual ducts 21 and the intermediate duct 31 and/or between a set of the connection duct 41 and 42 and the final duct 51.

(H04) While the above exemplary embodiment employs the intermediate duct 31 that is formed of a single member, the intermediate duct 31 is not limited thereto. For example, the first connection duct 41 and the second connection duct 42 may be connected to respective intermediate ducts. While the above exemplary embodiment employs a combination of the color Y, the color M, the color C, and the color K, the combination of colors may be changed in any way. Furthermore, an intermediate duct for three colors of Y, M, and C and an intermediate duct for the color K may be employed.

(H05) While the above exemplary embodiment employs the ribs 71 and 72 or 72', such ribs may be omitted.

(H06) While the above exemplary embodiment employs the connection ducts 41 and 42 each having a cross-sectional area that is narrowed in the gas conveying direction, the connection ducts 41 and 42 may each have a cross-sectional area that is constant or widened in the gas conveying direction. Furthermore, the individual ducts 21 may each have a narrowed shape in the gas conveying direction.

(H07) While the above exemplary embodiment relates to a powder conveying device configured to convey airborne developer particles generated from the development areas, the powder conveying device is not limited thereto. For example, the powder conveying device may be applied to a device configured to convey airborne paper lint generated from the recording sheet S when the recording sheet S comes into or goes out of contact with the intermediate transfer belt B in the second transfer area Q4 or paper lint collected together with developer particles from the intermediate transfer belt B by the belt cleaner CLB. The powder conveying device may further be applied to a device configured to collect and convey a discharge product, which is exemplary powder, generated when the charging corotrons CCy, CCm, CCc, and CCk charge the photoconductor drums Py, Pm, Pc, and Pk or a discharge product generated when an electrical discharge occurs in the development areas, the first transfer areas Q3, or the second transfer area Q4, where the photoconductor drums Py, Pm, Pc, and Pk serving as image-carrying components or the intermediate transfer belt B is provided, with the application of a voltage. The powder conveying device may further be applied to a device configured to collect and convey ultrafine particles (UP), which are exemplary powder, scattered when an image is fixed by the fixing device F.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

A powder conveying device comprising:

a first conveying component through which gas containing powder is to be conveyed;

a second conveying component to which a downstream end of the first conveying component is connected and through which the gas received from the first conveying component is to be conveyed, the second conveying component extending in a second gas conveying direction that intersects a first gas conveying direction defined by the first conveying component;

a third conveying component extending from the second conveying component and through which the gas received from the second conveying component is to be conveyed, the third conveying component extending in a third gas conveying direction that intersects the second gas conveying direction;

a fourth conveying component to which a downstream end of the third conveying component is connected and through which the gas received from the third conveying component is to be conveyed, the fourth conveying component extending in a fourth gas conveying direction that intersects the third gas conveying direction; and a removing component provided on a downstream side in the fourth gas conveying direction relative to the fourth conveying component, the removing component being configured to remove powder from the gas.

(((2)))

The powder conveying device according to (((1))), further comprising:

an impact-force-increasing component configured to increase a force of impact of the powder contained in the gas on an inner wall surface of any of the conveying components.

(((3)))

The powder conveying device according to (((2))), wherein the third conveying component has a cross-sectional area decreasing toward a downstream side in the third gas conveying direction and serves as the impact-force-increasing component.

(((4)))

The powder conveying device according to any of (((1))) to (((3))), further comprising:

a vortex generating component configured to generate a vortex in the gas that is being conveyed.

(((5)))

The powder conveying device according to (((4))), wherein the vortex generating component is located at a connection between an upstream one of the conveying components and a downstream one of the conveying components and projects in a direction intersecting the gas conveying direction defined by the upstream one of the conveying component.

(((6)))

The powder conveying device according to (((4))), wherein the vortex generating component is located in the fourth conveying component and projects in a direction intersecting the fourth gas conveying direction.

(((7)))

An image forming apparatus comprising:

an image recording component configured to record an image on a medium; and the powder conveying device according to any one of (((1))) to (((6))) that is configured to convey powder generated from the image recording component.

(((8)))

The image forming apparatus according to (((7))), wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

(((9)))

The image forming apparatus according to (((7))) or (((8))), wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes paper lint generated from the medium and adhered to the transfer component.

(((10)))

The image forming apparatus according to any one of (((7))) to (((9))), wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes a discharge product generated when a voltage is applied to an area where the image-carrying component is provided.

(((11)))

The image forming apparatus according to any one of (((7))) to (((10))), wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes particles scattered when the fixing component performs fixing.

What is claimed is:

1. A powder conveying device comprising:

a first conveying component through which gas containing powder is to be conveyed;

a second conveying component to which a downstream end of the first conveying component is connected and through which the gas received from the first conveying component is to be conveyed, the second conveying component extending in a second gas conveying direction that intersects a first gas conveying direction defined by the first conveying component;

a third conveying component extending from the second conveying component and through which the gas received from the second conveying component is to be conveyed, the third conveying component extending in a third gas conveying direction that intersects the second gas conveying direction;

a fourth conveying component to which a downstream end of the third conveying component is connected and through which the gas received from the third conveying component is to be conveyed, the fourth conveying component extending in a fourth gas conveying direction that intersects the third gas conveying direction, wherein the third conveying component includes two components extending parallel to each other along the third gas conveying direction, each of the two components directly connecting with the fourth conveying component; and a removing component provided on a downstream side in the fourth gas conveying direction relative to the fourth conveying component, the removing component being configured to remove powder from the gas.

2. The powder conveying device according to claim 1, further comprising:

an impact-force-increasing component configured to increase a force of impact of the powder contained in the gas on an inner wall surface of any of the conveying components.

3. The powder conveying device according to claim 2, wherein the third conveying component has a cross-sectional area decreasing toward a downstream side in the third gas conveying direction and serves as the impact-force-increasing component.

4. An image forming apparatus comprising:

an image recording component configured to record an image on a medium; and the powder conveying device according to claim 3 that is configured to convey powder generated from the image recording component.

5. The image forming apparatus according to claim 4, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

6. An image forming apparatus comprising:

an image recording component configured to record an image on a medium; and the powder conveying device according to claim 2 that is configured to convey powder generated from the image recording component.

7. The image forming apparatus according to claim 6, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

8. The powder conveying device according to claim 1, further comprising:

a vortex generating component configured to generate a vortex in the gas that is being conveyed.

9. The powder conveying device according to claim 8, wherein the vortex generating component is located at a connection between an upstream one of the conveying components and a downstream one of the conveying components and projects in a direction intersecting the gas conveying direction defined by the upstream one of the conveying component.

10. An image forming apparatus comprising:

an image recording component configured to record an image on a medium; and the powder conveying device according to claim 5 that is configured to convey powder generated from the image recording component.

11. The image forming apparatus according to claim 10, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

12. The powder conveying device according to claim 8, wherein the vortex generating component is located in the fourth conveying component and projects in a direction intersecting the fourth gas conveying direction.

13. An image forming apparatus comprising:

an image recording component configured to record an image on a medium; and the powder conveying device according to claim 6 that is configured to convey powder generated from the image recording component.

14. An image forming apparatus comprising:

an image recording component configured to record an image on a medium; and the powder conveying device according to claim 4 that is configured to convey powder generated from the image recording component.

15. The image forming apparatus according to claim 14, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

16. An image forming apparatus comprising:

an image recording component configured to record an image on a medium; and the powder conveying device according to claim 1 that is configured to convey powder generated from the image recording component.

17. The image forming apparatus according to claim 16, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes airborne developer particles generated when the developing component performs development.

18. The image forming apparatus according to claim 16, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes paper lint generated from the medium and adhered to the transfer component.

19. The image forming apparatus according to claim 16, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes a discharge product generated when a voltage is applied to an area where the image-carrying component is provided.

20. The image forming apparatus according to claim 16, wherein the image recording component includes an image-carrying component; a latent-image-forming component configured to form a latent image on the image-carrying component; a developing component configured to develop the latent image on the image-carrying component; a transfer component configured to transfer the image developed on the image-carrying component to a medium; and a fixing component configured to fix the image transferred to the medium, and wherein the powder to be conveyed by the powder conveying device includes particles scattered when the fixing component performs fixing.

* * * * *